United States Patent [19]

Laws et al.

[11] Patent Number: 4,940,948
[45] Date of Patent: Jul. 10, 1990

[54] CLOCK DRIVEN DATA SAMPLING CIRCUIT

[75] Inventors: Peter G. Laws; Graham J. Fletcher, both of Wiltshire, United Kingdom

[73] Assignee: Plessey Overseas Limited, England

[21] Appl. No.: 329,718

[22] Filed: Mar. 28, 1989

[30] Foreign Application Priority Data

Mar. 29, 1988 [GB] United Kingdom ............... 8807402

[51] Int. Cl.$^5$ .............................................. H03D 3/00
[52] U.S. Cl. .................................. 329/307; 331/1 A; 331/23; 331/25
[58] Field of Search ........................ 331/1 A, 8, 11, 12, 331/23, 25; 328/133, 134, 155; 307/511, 512; 329/122, 123, 124, 305, 307

[56] References Cited

U.S. PATENT DOCUMENTS 4,806,880 2/1989 Laws ....................... 331/8

Primary Examiner—Robert J. Pascal

[57] ABSTRACT

A circuit for recovering clock information from an incoming data signal preferably in NRZ1 form, the circuit including a VCO (18) providing a clock signal (CK) to four integrate/hold circuits (I1 to I4) which receive an incoming data signal, the integrate/hold circuits providing an error signal to the VCO (18) for adjusting the phase thereof to that of the incoming data signal, the integrate/hold circuits being sequenced by logic (10) to provide within each period of the clock signal three functions: (1) an integration of the incoming data signal in every bit period in which a voltage transition occurs, (2) a holding of the integrated value within a subsequent bit period or periods, and (3) a resetting of the integrated value following the next voltage transition in the incoming data signal, whereby the held integrated value, whose magnitude is dependent of the phase of the clock signal relative to the phase of the incoming data signal, provides said error signal.

4 Claims, 4 Drawing Sheets

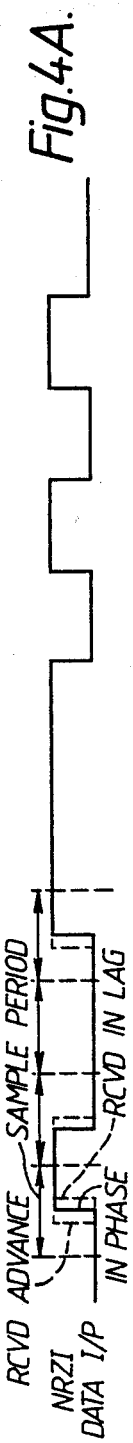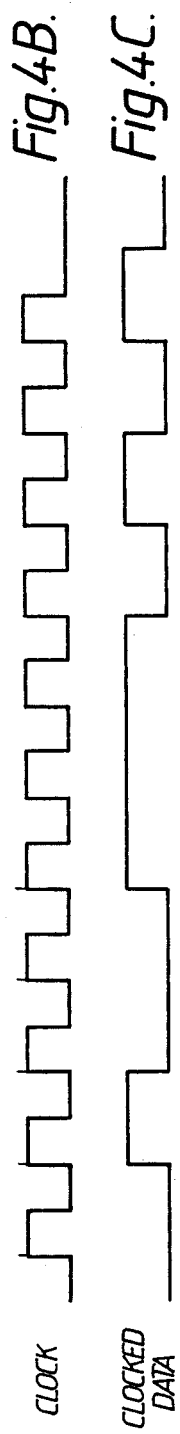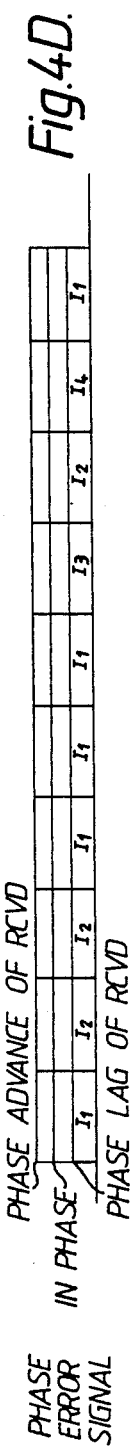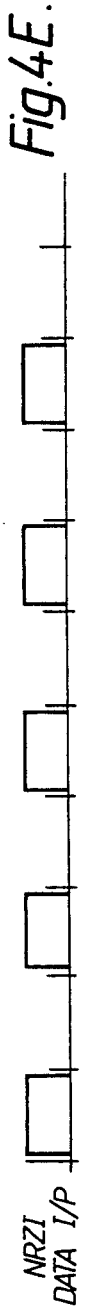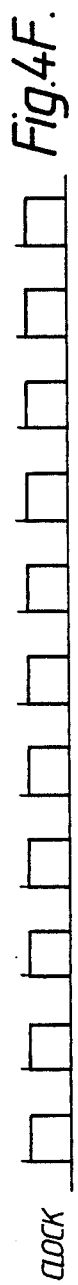

CLOCK DRIVEN DATA SAMPLING CIRCUIT

FIELD OF THE INVENTION

This invention relates to a circuit for recovering clock information from an incoming data signal. Such circuits are of particular use for aligning a local clock in a data receiver circuit to an incoming data signal to minimize bit error rates in the received data signal.

BACKGROUND ART

Data signals are frequently nowadays transmitted along optical fiber links. Most of the noise in such signals is exhibited as phase jitter, being created by dispersion within the fibers, differential slew rates in the edges of the signals caused by LED switching, and because of noise in transimpedance amplifiers. An international standard, FDDI, has been set requiring that data be transmitted at a set rate, typically 125MBs$^{-1}$ in 4B/5B format (a five bit code word represents four data bits) and in non return to zero inverse (NRZ1) coding wherein a positive or negative transition in a bit period indicates a '1' and the absence of a transition in a bit period indicates a '0'. Transitions may occur at a maximum rate of one every bit period, and at a minimum rate of one every 10 bit periods (known as the master line state).

Thus a major problem in the design of receiver circuits for such data signals is the provision of a local clock which can accurately lock onto the incoming data signal despite phase jitter so that the data signal can accurately be decoded with minimal bit error rates.

In U.S. Pat. No. 4,806,880, assigned to Plessey Overseas Limited there is disclosed a receiver circuit including a modified Costas phase locked loop including a voltage controlled oscillator (herein referred to as a VCO) and dual integrate and hold circuits responsive to an incoming biphase Manchester coded signal to provide an error signal to the VCO dependent on the phase difference between the incoming signal and a local clock signal. The dual integrate and hold circuits operate in phase opposition so that one circuit integrates for half a cycle while the other circuit holds and then resets. This type of operation is suitable where there is a regular transition in each bit period providing phase information. However such circuits are not suitable where, as with NRZ1 coding, there is not a regular transition within the bit period of the incoming data signal, since transitions only occur when a '1' bit is indicated.

SUMMARY OF THE INVENTION

The present invention provides a circuit for recovering clock information from an incoming data signal including transitions between upper and lower voltage levels, the circuit including a controlled oscillator providing a clock signal to an integrate/hold means which receives an incoming data signal, the integrate/hold means providing an error signal to the controlled oscillator for adjusting the phase therof to that of the incoming data signal, the integrate/hold means providing within each period of the clock signal three functions: (1) an integration of the incoming data signal in every bit period in which a voltage transition occurs, (2) a holding of the integrated value within a subsequent bit period or periods, and (3) a resetting of the integrated value following the next voltage transition in the incoming data signal, whereby the held integrated value, whose magnitude is dependent of the phase of the clock signal relative to the phase of the incoming data signal, provides said error signal.

As preferred, a plurality of similar integrate/hold circuits are employed, each performing an integrate/hold/reset function during each bit period. In order to sample every voltage transition in the incoming data signal, three circuits are provided so that one circuit is in a condition for integrating an incoming signal upon a voltage transition, a second circuit can hold an integrated value previously integrated, and a third circuit can be reset from a value held in the circuit upon a previous voltage transition. To achieve such functions with three integrate/hold circuits requires complicated sequencing circuits for regulating the operation of the three circuits so that for example one circuit is always ready to receive a signal for integration while the other circuits are performing their respective functions.

In accordance with the invention, it is preferred to use four integrate/hold circuits, two such circuits being dedicated to positive-going transitions of the incoming data signal and two integrate/hold circuits being dedicated to negative-going transitions of the incoming data signal. In operation, one circuit of each pair integrates in each bit period, and the other circuit is reset. If no voltage transition occurs, the integrated value is discarded by resetting the circuit in the next bit period, but if a, say positive, voltage transition occurs, the integrated value is held over subsequent bit periods until such time as a negative going transition occurs following which the first circuit is reset. When the negative going transition occurs, one circuit of the negative pair integrates the signal and holds it over subsequent bit periods until a positive-going transition occurs following which it is reset. During the time when one circuit is being held, the other circuit of the appropriate pair is reset so as to be in condition for integration if necessary upon further voltage transitions.

If desired more that four circuits may be employed for example six circuits which provides for increased accuracy in that two held versions of the incoming signal can be averaged to avoid problems of different slew rates causing modified duty cycles.

Whilst in principle any type of integrate/hold circuit may be employed which is resettable within a well defined time period, it is preferred to employ a circuit of the type disclosed and claimed in U.S. Pat. No. 4,806,880.

BRIEF DESCRIPTION OF THE DRAWINGS

A preferred embodiment of the invention will now be described with reference to the accompanying drawings wherein:

FIGS. 4 are waveform diagrams of typical operating sequences of the circuit of FIG. 1.

DESCRIPTION OF THE PREFERRED EMBODIMENT

Figure 1:
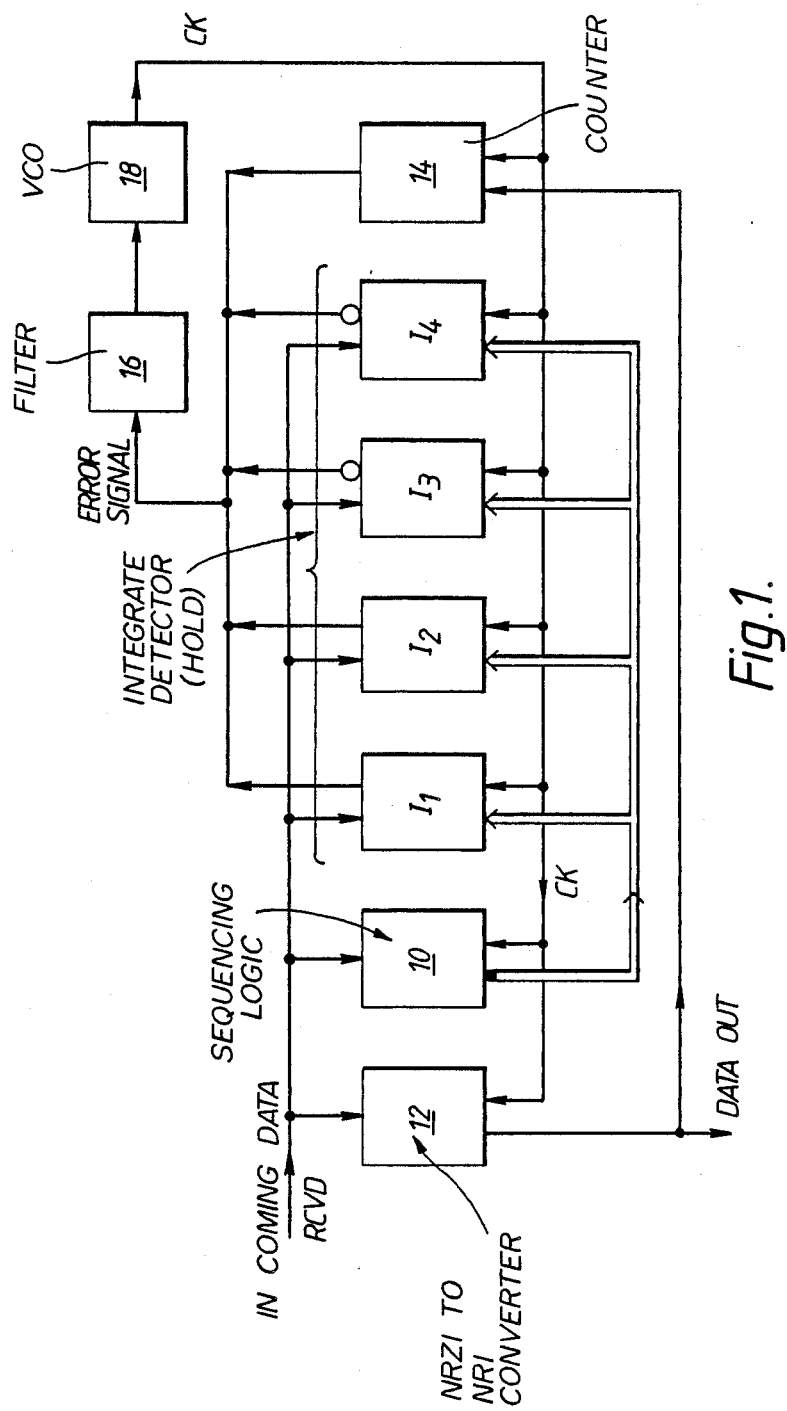
FIG. 1 is a block diagram of the preferred embodiment of the present invention; and, FIG. 2 is a block diagram of sequencing logic for the integrate/hold circuits of FIG. 1.

Referring now to the block diagram there is shown a receiver for receiving incoming data RCVD, being data transmitted across an optical fiber link at 125Mbs$^{-1}$ in an NRZ1 code wherein a '1' bit is indicated by a voltage level transition (positive or negative) in a bit period and a '0' bit indicated by the absence of a transition, as shown in FIG. 4A.

The data signal is coupled to an integrate/hold detector comprising four similar circuits $I_1$, $I_2$, $I_3$ $I_4$ and sequencing logic 10. Data signal RCVD is applied to each of circuits $I_1$ to $I_4$ and logic 10.

Data signal RCVD is coupled to an NRZ1 to NRZ converter 12 for converting the data into an NRZ format for further processing e.g. serial to parallel conversion. The output of converter 12 is coupled to a counter 14, the output of which is coupled together with ganged outputs from $I_1$ to $I_4$, via a charge pump and filter 16 to a voltage controlled oscillator 18, the output of VCO 18 providing a clock signal which is coupled to counter 14, integrate/hold detectors $I_1$ to $I_4$, sequencing logic 10, and converter 12. VCO 18 may be of any suitable type for example a narrow band VCO having a clearly defined center frequency, since normally the frequency of the data RCVD will be similarly well defined.

Figure 3:
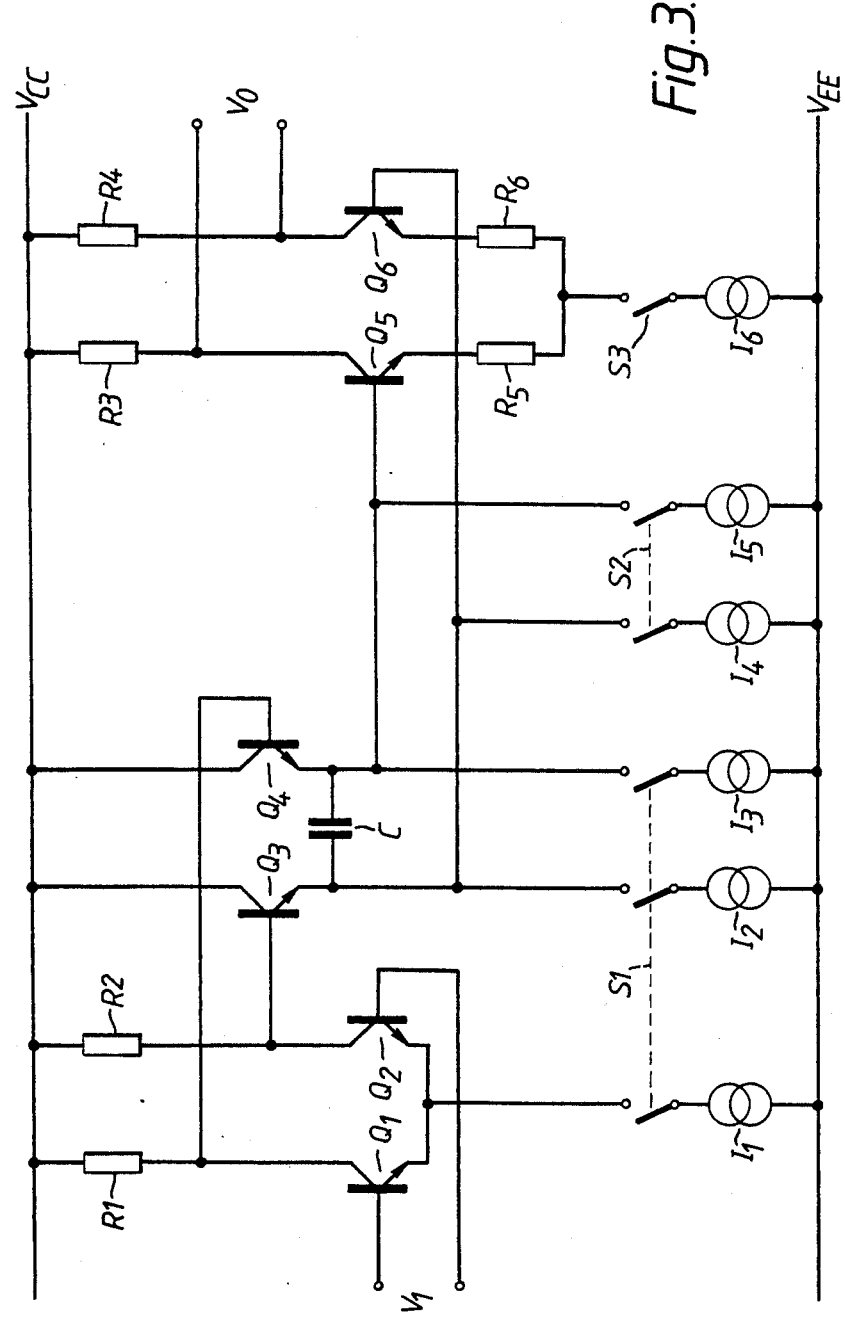
FIG. 3 is a circuit diagram of an integrated/hold circuit of FIG. 1; and, A-F

A configuration of an integrate/hold circuit is shown in FIG. 3 and is more fully described in U.S. Pat. No. 4,806,880. A data signal is applied in differential form to two transistors connected in long tailed pair configuration Q1, Q2 and providing outputs to two transistors Q3, Q4 having a sampling capacitor C connected between their emitters, the outputs from the emitters of transistors Q3, Q4 being connected to a hold circuit Q5, Q6 comprising transistors in long-tailed pair configuration. Current sources I1 to I6 are selectively connected to the transistor stages Q1 to Q6 by switches indicated schematically as S1, S2, S3. These switches are controlled by suitable control logic inputs from control logic 10.

Figure 2:
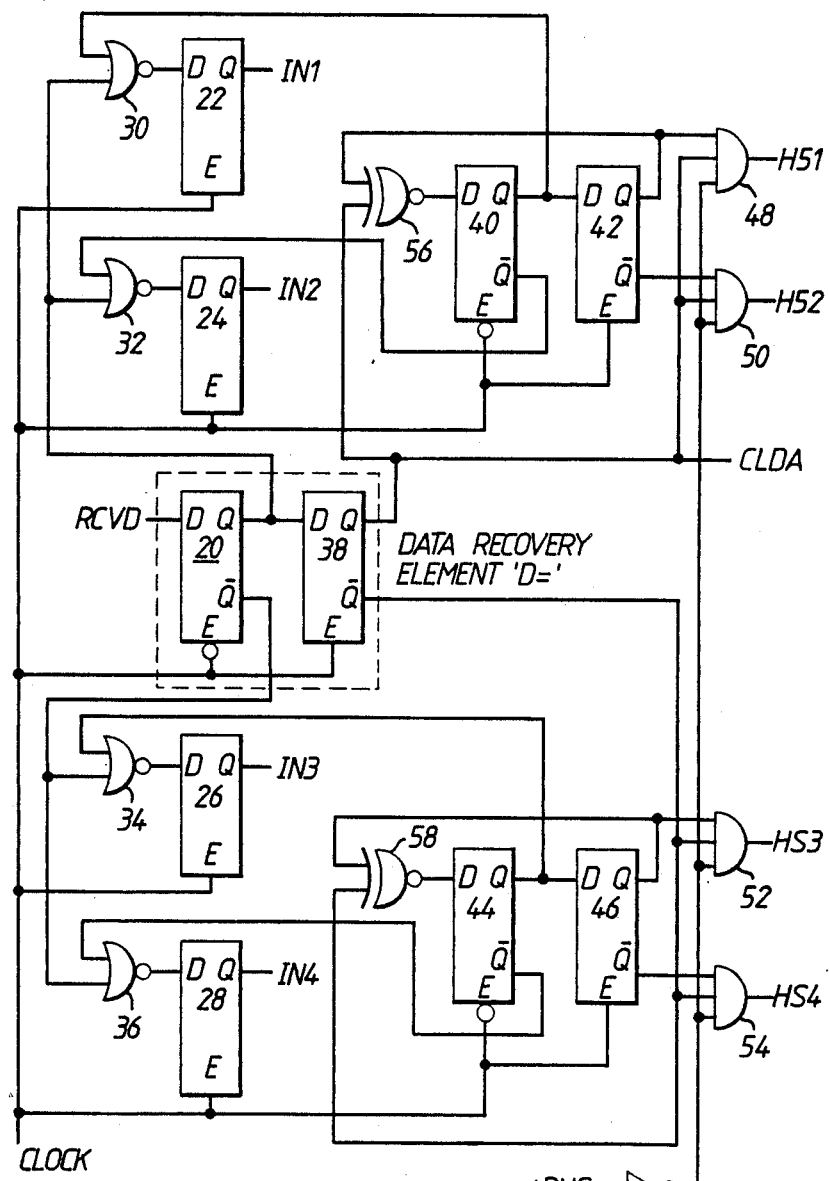

Control logic 10 is shown in more detail in FIG. 2 as comprising D-type flip-flop 20 for receiving a data signal RCVD and providing outputs to four further D-type flip-flops 22 to 28 via NOR gates 30 to 36. The clock signal CK is also clocked to flip-flops 20 to 28, and to further flip-flops 38 to 46. The Q and Q' outputs of flip-flop 20 are coupled to NOR gates 30 to 36. The Q, Q' outputs of flip-flop 38 are coupled to AND gates 48 to 54 and to X-OR gates 56, 58. The outputs of flip-flop 40 are coupled to gates 48, 50, 56. The outputs of flip-flop 44 are coupled to gates 34, 36 and the outputs of flip-flop 46 are coupled to gates 52, 54, 58.

In operation, data RCVD is applied to the input of the integrate/hold circuits I1 to I4. The integrate/hold circuits are divided into two pairs I1, I2 and I3, I4, the circuits of each pair operating in phase opposition, one circuit operating in each bit period to integrate an incoming signal by closing of switch S1 while the other integrate/hold circuit operates to reset an integrated signal by closure of switch S2 in the absence of received data. Should a voltage transition be received and detected, the appropriate integrate/hold circuit is held in a hold condition by control circuit 10. Control circuit 10 is clocked by clock signal CK and operates in response to voltage transitions received at the input to flip-flop 20. A positive transition provides a high signal to gates 30, 32 and a negative transition provides a high signal to gates 34, 36. The gates 30, 32 are sequenced by flip-flops 40, 42 so that upon a positive voltage transition one flip-flop provides an integrate signal IN1 to gate S1 (FIG. 3) of circuit I1 and the other flip-flop applies a reset signal to gate S2 of circuit I2. The appropriate gate 48, 50 then provides in the subsequent bit period a hold signal HS1 or HS2 to gate S3.

A similar operation occurs when a negative transition occurs with gates and flip-flops 26 to 54, appropriate signals being applied to gates S1 to S3 of integrate/hold circuits I3, I4. In addition a negative transition resets the hold signal HS1 or HS2 of gates 48, 50 and resets the appropriate circuit I1 or I2 while putting the other circuit into condition for integration.

The integrated values which are held by circuits I1 to I4 are provided as an error signal to filter 16 and hence to VCO 18. The form of the error signal is shown in FIG. 4D.

When in the condition shown in solid lines in FIG. 4A, the incoming data signal and the clock signal are perfectly in phase with voltage transitions in RCVD occuring at the center of the bit period, then the integrated values in I1 to I4 all have the same magnitude as shown in FIG. 4D. If the phase of RCVD advances so that voltage transitions occur in the first part of the bit period, then the phase error signal increases since the integrated values in I1 to I4 will all increase. If however the phase of RCVD lags, then the phase error signal decreases since the integrated values in I1 to I4 will all decrease.

Naturally such changes in phase error signal will operate to shift the phase of CK in an appropriate direction to reduce the phase error.

It is possible with an extended sequence of all 1's that the circuit be in a condition which does not detect the incoming data. This is shown in FIG. 4E in which the phase has drifted and there is differential slew rates in the edge transitions so as to create a duty cycle not equal to 50/50 such that both positive and negative transitions occur within a single sampling period. In this situation the data will not be detected in converter 12 and on all '0's state may be indicated. There is therefore provided a further circuit comprising counter 14 responsive to the clock signal CK which counts up to 16 and forces a transition error signal into charge pump and filter 16 in the absence of a data signal output from circuit 12 which acts to reset the counter.

There is shown and disclosed a circuit for recovering clock in formation which is suitable for use with data in NRZ1 form. It is suitable for integration since the various integrate/hold circuits may be integrated on a single chip with similar resistance/capacitance values (although absolute values will only be approximate).

Although the circuit disclosed is designed for receiving data in NRZ1 form, the invention is not limited to such a form of coding and may be employed with any form of NRZ coding.

What is claimed is:

1. A circuit for recovering clock information from an incoming data signal including transitions between upper and lower voltage levels, the circuit including a controlled oscillator providing a clock signal to an integrate/hold means which receives an incoming data signal, the integrate/hold means providing an error signal to the controlled oscillator for adjusting the phase thereof to that of the incoming data signal, the integrate/hold means providing within each period of the clock signal three functions: (1) an integration of the incoming data signal in every bit period in which a voltage transition occurs, (2) a holding of the integrated value within a subsequent bit period or periods, and (3) a resetting of the integrated value following the next voltage transition in the incoming data signal, whereby the held integrated value, whose magnitude is dependent of the phase of the clock signal relative to the phase of the incoming data signal, provides said error signal, and a counter for counting clock periods and being reset in response to recovered data transitions, and being operative to provide a phase error signal to said controlled oscillator upon reaching a predetermined count.

2. A circuit for recovering clock information from an incoming data signal including transitions between upper and lower voltage levels, the circuit including a controlled oscillator providing a clock signal to an integrate/hold means which receives an incoming data signal, the integrate/hold means providing an error signal to the controlled oscillator for adjusting the phase thereof to that of the incoming data signal, the integrate/hold means providing within each period of the clock signal three functions: (1) an integration of the incoming data signal in every bit period in which a voltage transition occurs, (2) a holding of the integrated value within a subsequent bit period or periods, and (3) a resetting of the integrated value following the next voltage transition in the incoming data signal, whereby the held integrated value, whose magnitude is dependent of the phase of the clock signal relative to the phase of the incoming data signal, provides said error signal;

said integrate/hold means including first and second pairs of integrate/hold circuits, each of said first and second pairs comprising a first and a second integrate/hold circuit, and including control means responsive to the incoming data signal so that the first pair of circuits is responsive to positive going transitions and the second pair of circuits is responsive to negative going transitions, wherein, for each pair, said control means is operative so that said first integrate/hold circuit is operative to integrate the incoming data signal if it contains a transition or to hold such integrated value, while said second integrate/hold circuit is reset so as to be ready for an integration operation in a subsequent period;

said control means comprising a logic circuit including a plurality of bistable gates responsive to an incoming data signal and to said clock signal whereby to provide within each clock period appropriate integrate, hold and reset control signals to each integrate/hold circuit.

3. A circuit according to claim 2 wherein said bistable gates comprise D-type flip flops.

4. A circuit for recovering clock information from an incoming data signal including random transitions between upper and lower voltage levels, the circuit including a phase locked loop arrangement including a voltage controlled oscillator providing a clock signal, an integrate/hold means, a single feedback path coupled between said voltage controlled oscillator and said integrate/hold means to provide said clock signal thereto, said integrate/hold means being responsive to said clock signal and said incoming data signal, in order to provide an error signal to the voltage controlled oscillator for adjusting the phase thereof to that of the incoming data signal;

the integrate/hold means comprising at least first and second pairs of integrate/hold circuits, each of said first and second pairs comprising a first and a second integrate/hold circuit;

control means responsive to the incoming data signal so that the first pair of circuits is responsive to positive going transitions and the second pair of circuits is responsive to negative going transitions, wherein, for each pair, said control means is operative so said first integrate/hold circuit is operative to integrate the incoming data signal if it contains a transition or to hold such integrated value, while said second integrate/hold circuit is reset so as to be ready for an integration operation in a subsequent period;

whereby the integrate/hold means provides three functions: (1) an integration of the incoming data signal in every bit period in which a voltage transition occurs, (2) a holding of the integrated value within a subsequent bit period or periods, and (3) a resetting of the integrated value following the next voltage transition in the incoming data signal, whereby the held integrated value, whose magnitude is dependent of the phase of the clock signal relative to the phase of the incoming data signal, provides said error signal.

* * * * *